(12) United States Patent
Ikeda et al.

(10) Patent No.: US 11,037,266 B2
(45) Date of Patent: Jun. 15, 2021

(54) ATTACHED SUBSTANCE DETECTION DEVICE AND ATTACHED SUBSTANCE DETECTION METHOD

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 4 days.

(21) Appl. No.: 16/564,794

(22) Filed: Sep. 9, 2019

(65) Prior Publication Data

US 2020/0219222 A1 Jul. 9, 2020

(30) Foreign Application Priority Data

Jan. 7, 2019 (JP) .............................. JP2019-000794

(51) Int. Cl.
*G06T 1/00* (2006.01)
*B60R 1/00* (2006.01)
*G06T 7/00* (2017.01)
*H04N 5/225* (2006.01)

(52) U.S. Cl.
CPC .............. *G06T 1/0007* (2013.01); *B60R 1/00* (2013.01); *G06T 7/0002* (2013.01); *H04N 5/225* (2013.01); *B60R 2300/30* (2013.01); *G06T 2207/20* (2013.01); *G06T 2207/30* (2013.01)

(58) Field of Classification Search
CPC ....... G06T 1/0007; G06T 7/0002; B60R 1/00; H04N 5/225; H04N 5/2171; H04N 5/217; H04N 5/21
See application file for complete search history.

(56) References Cited

U.S. PATENT DOCUMENTS

2019/0281170 A1* 9/2019 Yokogawa .......... G06K 9/00442
2020/0274994 A1* 8/2020 Sunaga ................ H04N 5/2171

FOREIGN PATENT DOCUMENTS

JP   2012-038048 A   2/2012
JP   2014-030188 A   2/2014
JP   2018-072312 A   5/2018

* cited by examiner

*Primary Examiner* — Nicholas G Giles
(74) *Attorney, Agent, or Firm* — Oliff PLC

(57) ABSTRACT

An attached substance detection device according to an embodiment includes a calculation unit and a determination unit. The calculation unit calculates a score of a divided region that is provided by dividing a predetermined target region, based on an edge intensity in each pixel region of a captured image that is captured by an image-capturing device. The determination unit determines whether or not the target region is an attached substance region where an attached substance is attached to a lens of the image-capturing device, based on the score that is calculated by the calculation unit.

7 Claims, 9 Drawing Sheets

FIG.5
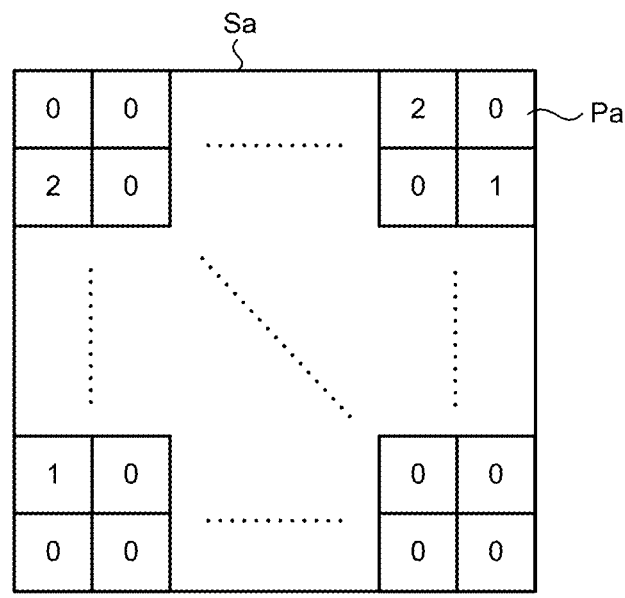
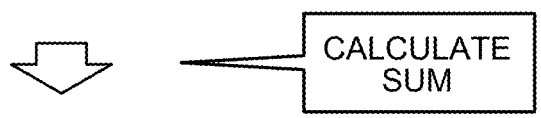
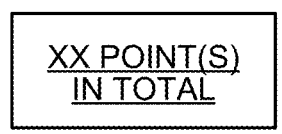
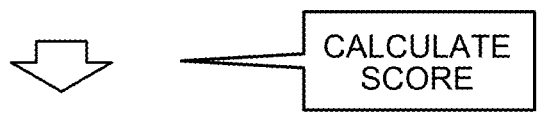
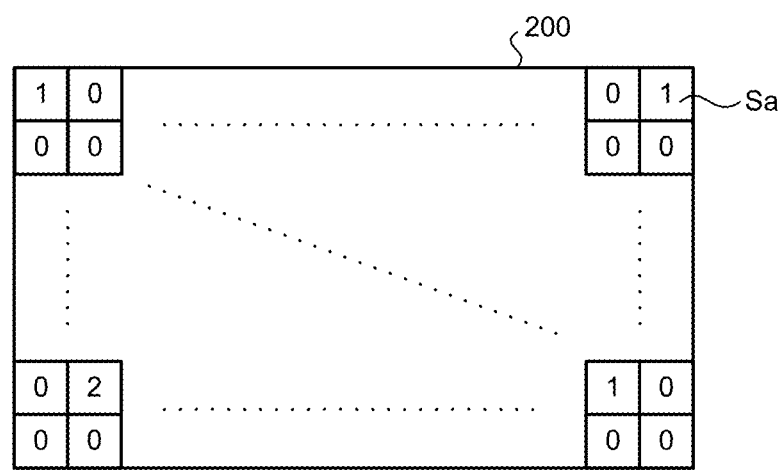

FIG.9
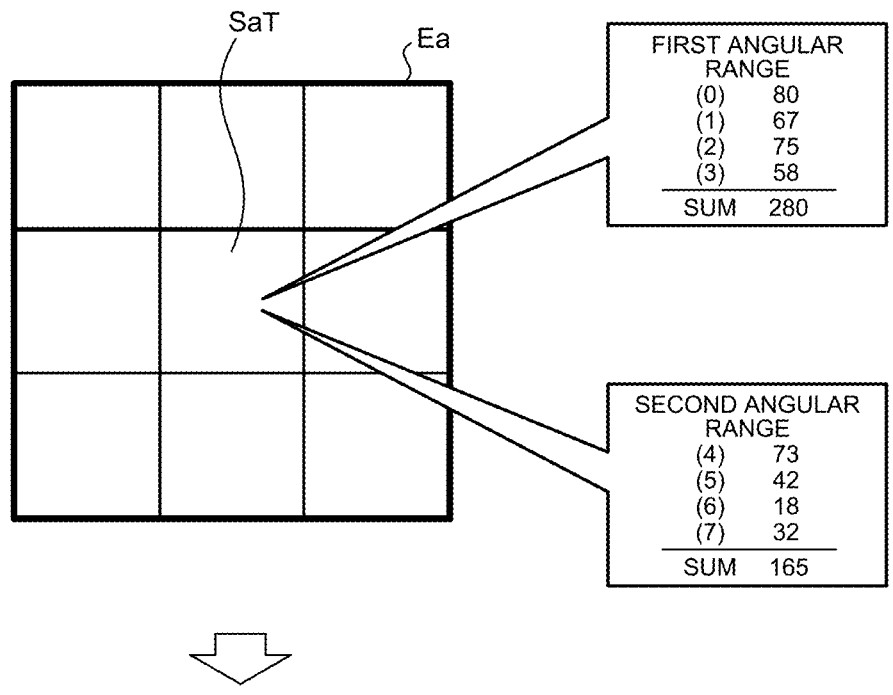
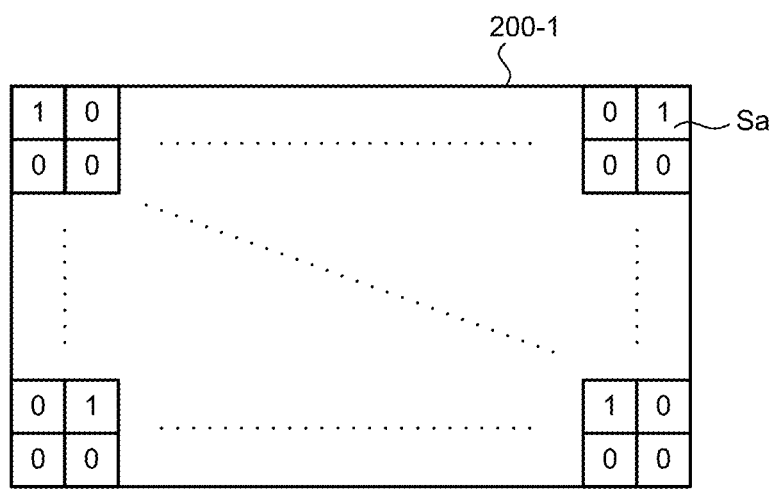

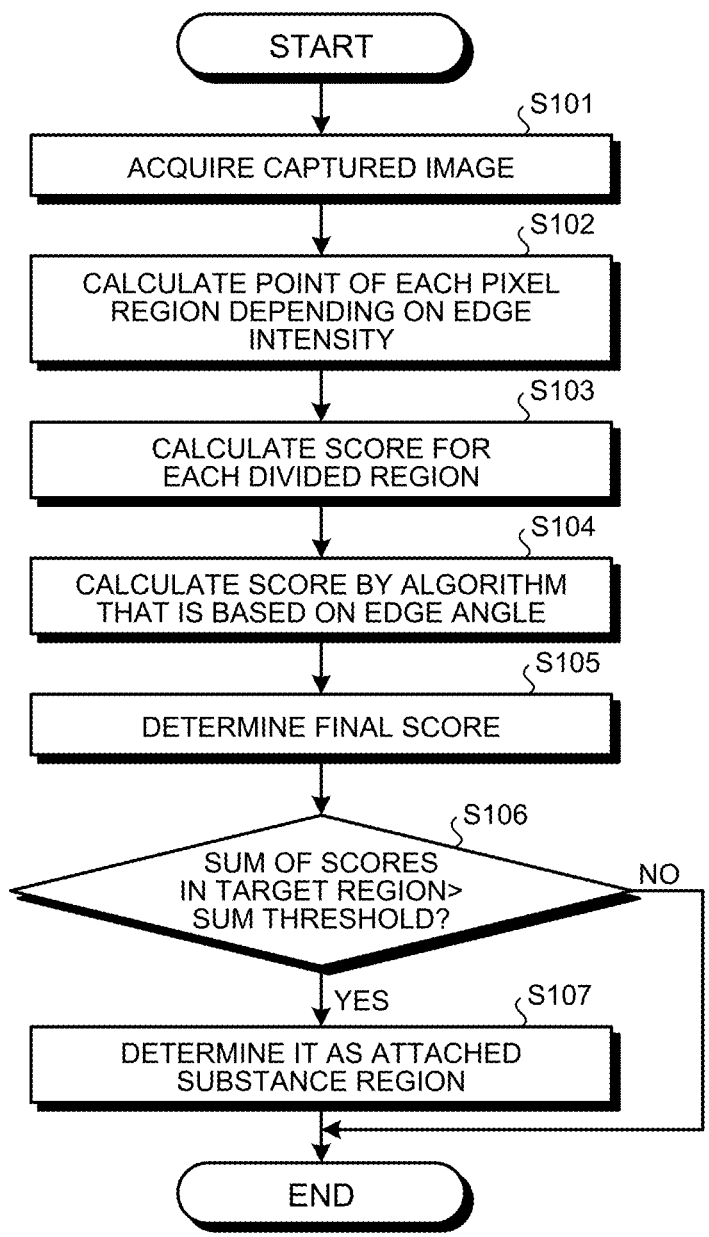

ATTACHED SUBSTANCE DETECTION DEVICE AND ATTACHED SUBSTANCE DETECTION METHOD

CROSS-REFERENCE TO RELATED APPLICATION(S)

This application is based upon and claims the benefit of priority to Japanese Patent Application No. 2019-000794 filed on Jan. 7, 2019, the entire contents of which are herein incorporated by reference.

FIELD

The present invention relates to an attached substance detection device and an attached substance detection method.

BACKGROUND

An attached substance detection device has conventionally been known that detects an attached substance that is attached to a camera lens, based on a captured image that is captured by a camera that is mounted on a vehicle or the like. An attached substance detection device may detect an attached substance based on, for example, a difference between captured images in a time sequence (see, for example, Japanese Patent Application Publication No. 2012-038048).

However, a conventional technique has room for improvement in that an attached substance is detected early.

SUMMARY

An attached substance detection device according to an embodiment includes a calculation unit and a determination unit. The calculation unit calculates a score of a divided region that is provided by dividing a predetermined target region, based on an edge intensity in each pixel region of a captured image that is captured by an image-capturing device. The determination unit determines whether or not the target region is an attached substance region where an attached substance is attached to a lens of the image-capturing device, based on the score that is calculated by the calculation unit.

BRIEF DESCRIPTION OF DRAWING(S)

FIG. 5 is a diagram illustrating a process content of a calculation unit.

FIG. 9 is a diagram illustrating a process content of an algorithm execution unit.

FIG. 11 is a flowchart illustrating process steps of a detection process for an attached substance that is executed by an attached substance detection device.

DESCRIPTION OF EMBODIMENT(S)

Hereinafter, an embodiment(s) of an attached substance detection device and an attached substance detection method as disclosed in the present application will be explained in detail with reference to the accompanying drawing(s). Additionally, the present invention is not limited by an embodiment(s) as illustrated below.

Figure 1:
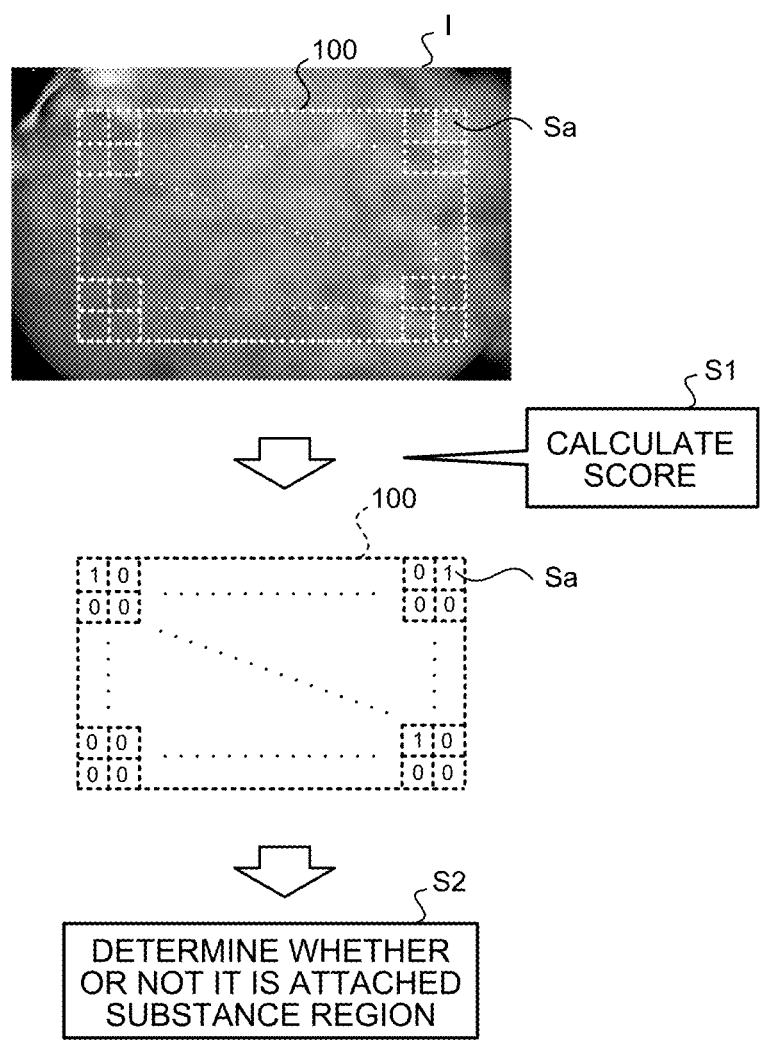
FIG. 1 is a diagram illustrating an outline of an attached substance detection method.

First, an outline of an attached substance detection method according to an embodiment will be explained by using FIG. 1. FIG. 1 is a diagram illustrating an outline of an attached substance detection method according to an embodiment. Additionally, FIG. 1 illustrates, for example, a captured image I that is captured in a state where snow is attached to a whole surface of a lens of an on-vehicle camera. An attached substance detection method according to an embodiment is executed by an attached substance detection device 1 (see FIG. 2) and detects an attached substance that is attached to a lens of a camera, based on a captured image I that is captured by an on-vehicle camera.

Additionally, an attached substance is not limited to snow and may be, for example, mud with a pale color or the like. In other words, it is sufficient that an attached substance shields a subject so as not to be captured in a captured image I and transmits a certain amount of light so that a slight brightness change is caused by an amount of light transmission. Additionally, a captured image I as illustrated in FIG. 1 is an image that is captured in a state where a lens of a camera is covered by snow.

Herein, a conventional attached substance detection device provides a technique for detecting an attached substance based on a difference between captured images in a time sequence. However, for example, in a case where a whole lens is buried in snow or the like, a difference between images is not readily caused, so that it may be impossible for a conventional technique to detect an attached substance.

Hence, in an attached substance detection method according to an embodiment, an attached substance is detected by utilizing an edge intensity that is detected from a single captured image I. Specifically, as illustrated in FIG. 1, an attached substance detection device 1 according to an embodiment first calculates a score of a target region 100 based on an edge intensity of each pixel region that is included in the target region 100 of a captured image I (step S1).

In an example as illustrated in FIG. 1, a target region 100 is a region that excludes a peripheral part in a captured image I and is a region that is a target to be detected in an attached substance region. Additionally, a target region 100 as illustrated in FIG. 1 is an example and it is possible to apply any modification thereto. Furthermore, it is also possible to set a plurality of target regions 100 in one captured image I.

Furthermore, as illustrated in FIG. 1, in an attached substance detection method according to an embodiment, a target region 100 is divided into a plurality of divided regions Sa and a score is calculated for each divided region Sa. Additionally, a divided region Sa is, for example, 40×40 or 1600 pixels and may be one pixel or another number of pixels as long as a target region 100 is divided.

Meanwhile, a region where a lens of a camera is covered by snow (that will be described as a snow-buried region below) in a captured image I is displayed in such a manner that a background image is blurred, and hence, has a feature of an edge that is changed gently.

Hence, a pixel that is included in a snow-buried region is a low edge pixel with an edge intensity that is comparatively low. On the other hand, an edge intensity of a pixel that is included in a region other than a snow-buried region (that will be described as a background region below) is an edge intensity with a variation that is caused by a background image.

That is, as an edge intensity of each pixel in a divided region Sa is decreased, a possibility of being a snow-buried region is increased, and as an edge intensity in a divided region Sa is increased, a possibility of being a background region is increased.

In an attached substance detection method according to an embodiment, attention is paid to this point, so that a score of each divided region Sa is calculated. For example, each divided region Sa is divided into an even smaller pixel region, a score that is dependent on an edge intensity of each pixel region is calculated, and a score of each divided region Sa is calculated based on a sum of points for each divided region Sa. A pixel region is, for example, 4×4 or 16 pixels. Therefore, in such an example, a divided region Sa has 10×10 or 100 pixel regions. Additionally, a pixel region may be composed of one pixel or another number of pixels.

For example, in an attached substance detection method according to an embodiment, a point of a pixel region with an edge intensity that is greater than a threshold is calculated as "1 point" and a point of a pixel region with an edge intensity that is less than or equal to the threshold is calculated as "0 points". In such a case, as a pixel with "0 point" in a divided region Sa is increased, a possibility of being a snow-buried region is increased. Additionally, a detail of such a point will be described later by using FIG. 4.

Subsequently, in an attached substance detection method according to an embodiment, a score is calculated as "0 pt" in a case where a sum of points in each divided region Sa is greater than a threshold, and a score is calculated as "1 pt" in a case where a sum of points in each divided region Sa is less than the threshold.

That is, in an example as described above, a score of a divided region Sa with a high possibility of snow being attached thereto is "1 pt" and a score of a divided region Sa with a low possibility of snow being attached thereto is "0 pt".

Then, in an attached substance detection method according to an embodiment, whether or not a target region 100 is an attached substance region is determined based on a score that is calculated at step S1 (step S2). For example, in an attached substance detection method according to an embodiment, in a case where a sum of scores in a target region 100 is greater than a threshold, the target region 100 is determined to be a snow-buried region as an attached substance region.

Thus, in an attached substance detection method according to an embodiment, a score that is dependent on an edge intensity is calculated and an attached substance region is provided based on a calculated score, so that it is possible to detect an attached substance with a high degree of accuracy even in a case where a difference between images is not provided. Therefore, it is possible for an attached substance detection method according to an embodiment to detect an attached substance early.

Figure 2:
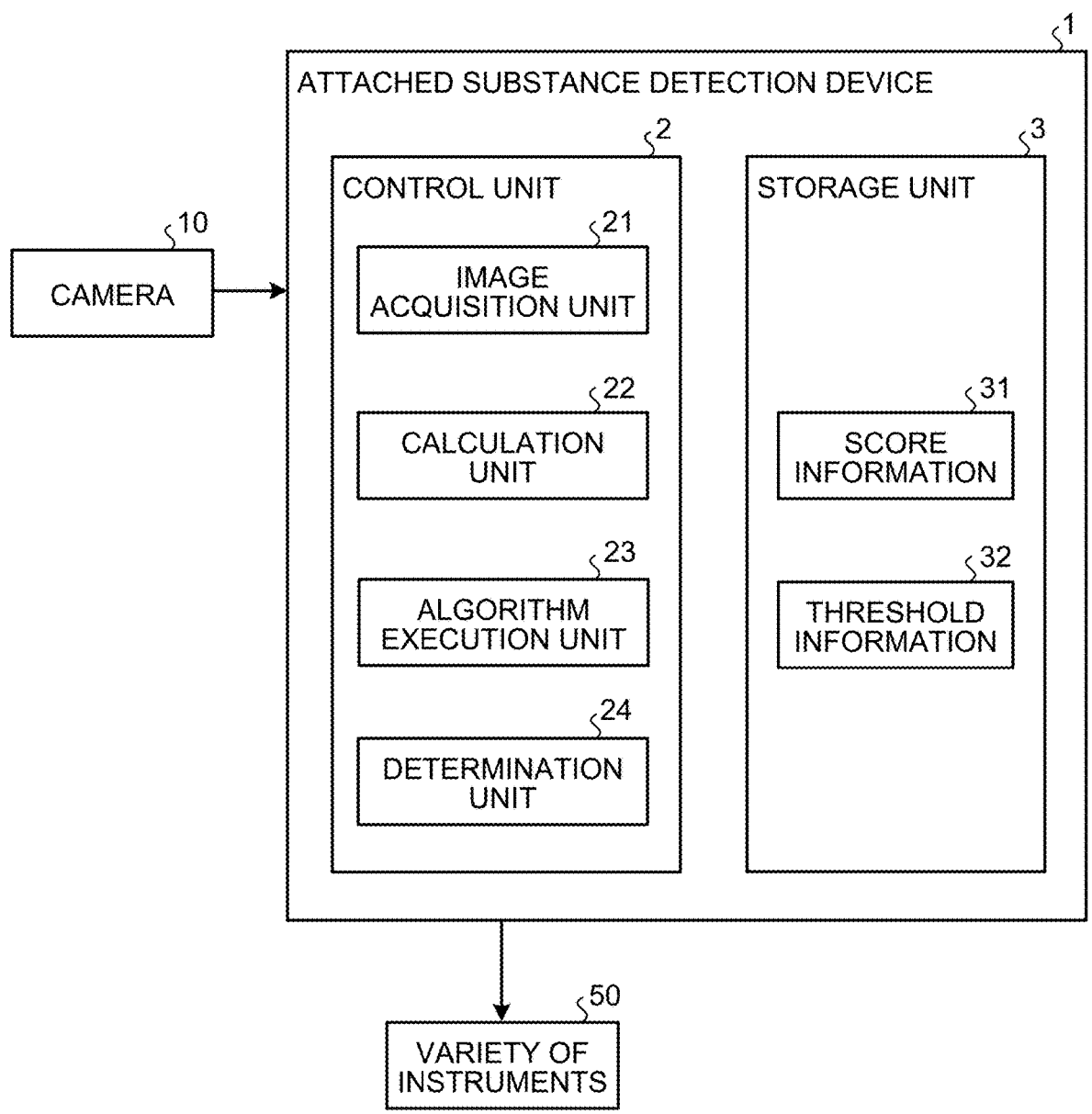
FIG. 2 is a block diagram illustrating a configuration of an attached substance detection device.

Next, a configuration of an attached substance detection device 1 according to an embodiment will be explained by using FIG. 2. FIG. 2 is a block diagram illustrating a configuration of the attached substance detection device 1 according to an embodiment. As illustrated in FIG. 2, the attached substance detection device 1 according to an embodiment is connected to a camera 10 and a variety of instruments 50. Additionally, although FIG. 2 illustrates a case where the attached substance detection device 1 is configured to be separate from the camera 10 and the variety of instruments 50, this is not limiting and it may be configured to be integral with at least one of the camera 10 and the variety of instruments 50.

The camera 10 is, for example, an on-vehicle camera that includes a lens such as a fish-eye lens and an image-capturing element such as a Charge Coupled Device (CCD) or a Complementary Metal Oxide Semiconductor (CMOS). For example, the camera 10 is provided at each of positions where it is possible to capture images of front, rear, and side situations of a vehicle, and outputs a captured image I that is captured thereby to the attached substance detection device 1.

The variety of instruments 50 are instruments that acquire a result of detection of the attached substance detection device 1 and executes a variety of control of a vehicle. The variety of instruments 50 include, for example, a display device that provides notice of a substance being attached to a lens of the camera 10 or an instruction to wipe off an attached substance by a user, a removal device that sprays a fluid, a gas, or the like toward a lens to remove an attached substance, or a vehicle control device that controls automated driving or the like.

As illustrated in FIG. 2, the attached substance detection device 1 according to an embodiment includes a control unit 2 and a storage unit 3. The control unit 2 includes an image acquisition unit 21, a calculation unit 22, an algorithm execution unit 23, and a determination unit 24. The storage unit 3 stores score information 31 and threshold information 32.

Herein, the attached substance detection device 1 includes, for example, a computer that has a Central Processing Unit (CPU), a Read Only Memory (ROM), a Random Access Memory (RAM), a data flash, an input/output port, and the like, and a variety of circuits.

A CPU of a computer reads and executes, for example, a program that is stored in a ROM, and thereby, functions as the image acquisition unit 21, the calculation unit 22, the algorithm execution unit 23, and the determination unit 24 of the control unit 2.

Furthermore, it is also possible to provide at least one or all of the image acquisition unit 21, the calculation unit 22, the algorithm execution unit 23, and the determination unit 24 of the control unit 2 that are composed of hardware such as an Application Specific Integrated Circuit (ASIC) or a Field Programmable Gate Array (FPGA).

Furthermore, the storage unit 3 corresponds to, for example, a RAM or a data flash. It is possible for a RAM or a data flash to store the score information 31, the threshold information 32, information of a variety of programs, and the like. Additionally, the attached substance detection device 1 may acquire a program as described above or a variety of information through another computer that is connected by a wired or wireless network or a portable recording medium.

The score information 31 is information that relates to a score for each divided region Sa. For example, a score image 200, 200-1 as described later is stored as the score information 31 in the storage unit 3. Furthermore, the threshold information 32 is information that relates to a variety of thresholds that are used for determination of an attached substance region.

The control unit 2 calculates a score in each divided region Sa that is provided by dividing a target region 100 of a captured image I, based on an edge intensity in each pixel region, and detects an attached substance region based on such a score. For example, a variety of thresholds that are used for determination of an attached substance region are stored as the threshold information 32 in the storage unit 3.

The image acquisition unit 21 acquires a captured image I that is captured by the camera 10. The image acquisition unit 21 executes gray-scale processing for transforming respective pixels in an acquired captured image I into respective tones from white to black depending on brightness thereof and executes a smoothing process for each pixel, so as to be output to the algorithm execution unit 23. Additionally, for a smoothing process, it is possible to use, for example, any smoothing filter such as an averaging filter or a Gaussian filter. Furthermore, gray-scale processing or a smoothing process may be omitted.

The calculation unit 22 calculates a score of a divided region Sa that is provided by dividing a predetermined target region 100 based on an edge intensity in each pixel region of a captured image I. In the present embodiment, the calculation unit 22 calculates a point that is dependent on an edge intensity for each pixel region and calculates a score based on a sum of points for each divided region Sa. A pixel region is a region that is identical to or even smaller than a divided region Sa. That is, a divided region Sa is a region that has at least one pixel region. Furthermore, a pixel region is a region that has at least one pixel. Specifically, in the present practical example, a pixel region is set as a rectangular region with 4×4 pixels or 16 pixels in total. Furthermore, a divided region Sa is set as a rectangular region with 10×10 pixel regions or 100 pixel regions in total (=1600 pixels).

Figure 3:
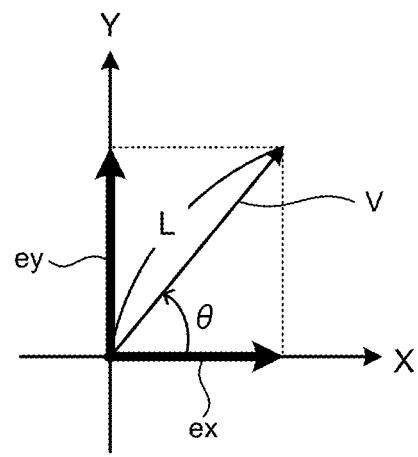
FIG. 3 is a diagram illustrating a process content of a calculation unit.
Figure 4:
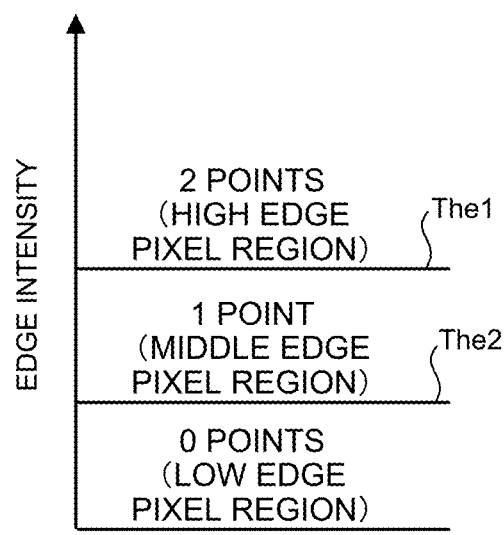
FIG. 4 is a diagram illustrating a process content of a calculation unit.

FIG. 3 to FIG. 5 are diagrams illustrating a process content of the calculation unit 22. As illustrated in FIG. 3, the calculation unit 22 first executes an edge detection process to detect an intensity of an edge ex in a direction of an X-axis (a leftward or rightward direction of a captured image I) and an intensity of an edge ey in a direction of a Y-axis (an upward or downward direction of the captured image I). For an edge detection process, it is possible to use, for example, any edge detection filter such as a Sobel filter or a Prewitt filter.

Subsequently, the calculation unit 22 calculates a vector V that includes information of an edge angle and an edge intensity of a pixel PX, by using a trigonometric function, based on an intensity of an edge ex in a direction of an X-axis and intensity of an edge ey in a direction of a Y-axis that are detected. Specifically, an edge angle in a vector V is represented by an angle θ between the vector V and an X-axis on a positive direction side and an edge intensity therein is represented based on a length L of the vector V. An edge intensity in a pixel region is calculated based on an edge intensity of a pixel PX that is possessed by the pixel region. For example, an average value or the like is provided.

Subsequently, the calculation unit 22 calculates a point that is dependent on an edge intensity for each pixel region based on an edge threshold The1 and an edge threshold The2 as illustrated in FIG. 4. An example as illustrated in FIG. 4 illustrates a case where a point of a pixel region with an edge intensity that is greater than an edge threshold The1 is "2 points", a point of a pixel region with an edge intensity that falls within a range of the edge threshold The1 to an edge threshold The2 is "1 point", and a point of a pixel region with an edge intensity that is less than the edge threshold The2 is "0 points".

Furthermore, a pixel region with an edge intensity that is greater than an edge threshold The1 is a pixel region with a high edge intensity and a low possibility of being a snow-buried region, and is a pixel region with a high possibility of being a background region. Furthermore, a pixel region with an edge intensity that is less than an edge threshold The2 is a region with a low edge intensity and a high possibility of being a snow-buried region, and is a pixel region with a low possibility of being a background region.

A pixel region with an edge intensity that falls within a range of an edge threshold The1 to an edge threshold The2 is a middle edge pixel with a middle edge intensity, and is a pixel region where possibilities of being a snow-buried region and a background region are intermediate between a high edge pixel region and a low edge pixel region.

The calculation unit 22 calculates a point that is dependent on an edge intensity for each pixel region based on an edge threshold The1 and an edge threshold The2 as illustrated in FIG. 4. Additionally, in a case where an edge intensity of a pixel PX is obtained as "$ex^2+ey^2$" as illustrated in FIG. 3, for example, an edge threshold The1 is "8192" and an edge threshold The2 is "16384".

Furthermore, although FIG. 4 illustrates a case where the calculation unit 22 calculates a point based on two edge thresholds or an edge threshold The1 and an edge threshold The2, the number of an edge threshold(s) may be one or may be three or more.

Subsequently, as illustrated in FIG. 5, the calculation unit 22 obtains a sum of points of respective pixel regions Pa in a divided region Sa and calculates a score of the divided region Sa depending on such a sum of points. As described above, as a point is increased, a possibility of being a snow-buried region is decreased, so that, as a sum of points is increased, a possibility of being a snow-buried region is decreased.

Furthermore, for example, in a case where a divided region Sa is composed of 10×10 or 100 pixel regions Pa, the calculation unit 22 executes calculation in such a manner that a score of a divided region Sa with a sum of points that is less than 10 points is "2 pt", a score of a divided region Sa with a sum of points that falls within a range of 10 points or greater and less than 30 points is "1 pt", and a score of a divided region Sa with a sum of points that is greater than or equal to 30 points is "0 pt".

Then, the calculation unit 22 generates a score image 200 where scores are linked to all divided regions Sa and transmits it to the determination unit 24 as described later. Additionally, a calculation method for a score is not limited to an example as described above and is able to be changed arbitrarily. For example, the calculation unit 22 may calculate a score based on an average value of edge intensities of respective pixel regions Pa in a divided region Sa.

Thus, the calculation unit 22 transforms an edge intensity of each pixel region Pa into a point and calculates a score of each divided region Sa based on a sum of points in respective divided regions Sa. Thereby, it is possible to calculate a score of a divided region Sa that is locally a snow-buried region, among respective divided regions Sa, so as to be low.

That is, in a case where an edge intensities of a predetermined number or more of pixel regions in a divided region Sa indicate a feature of a snow-buried region, a score is calculated as "1", so that it is possible to calculate a score for a snow-buried region appropriately.

By returning to an explanation of FIG. 2, the algorithm execution unit 23 will be explained. The algorithm execution unit 23 calculates a score of each divided region Sa by using an algorithm that is different from that of the calculation unit 22. For example, whereas the calculation unit 22 calculates a score by an algorithm that is based on an edge intensity of each pixel region, it is possible for the algorithm execution unit 23 to calculate a score based on an edge angle of each pixel region.

Figure 6:
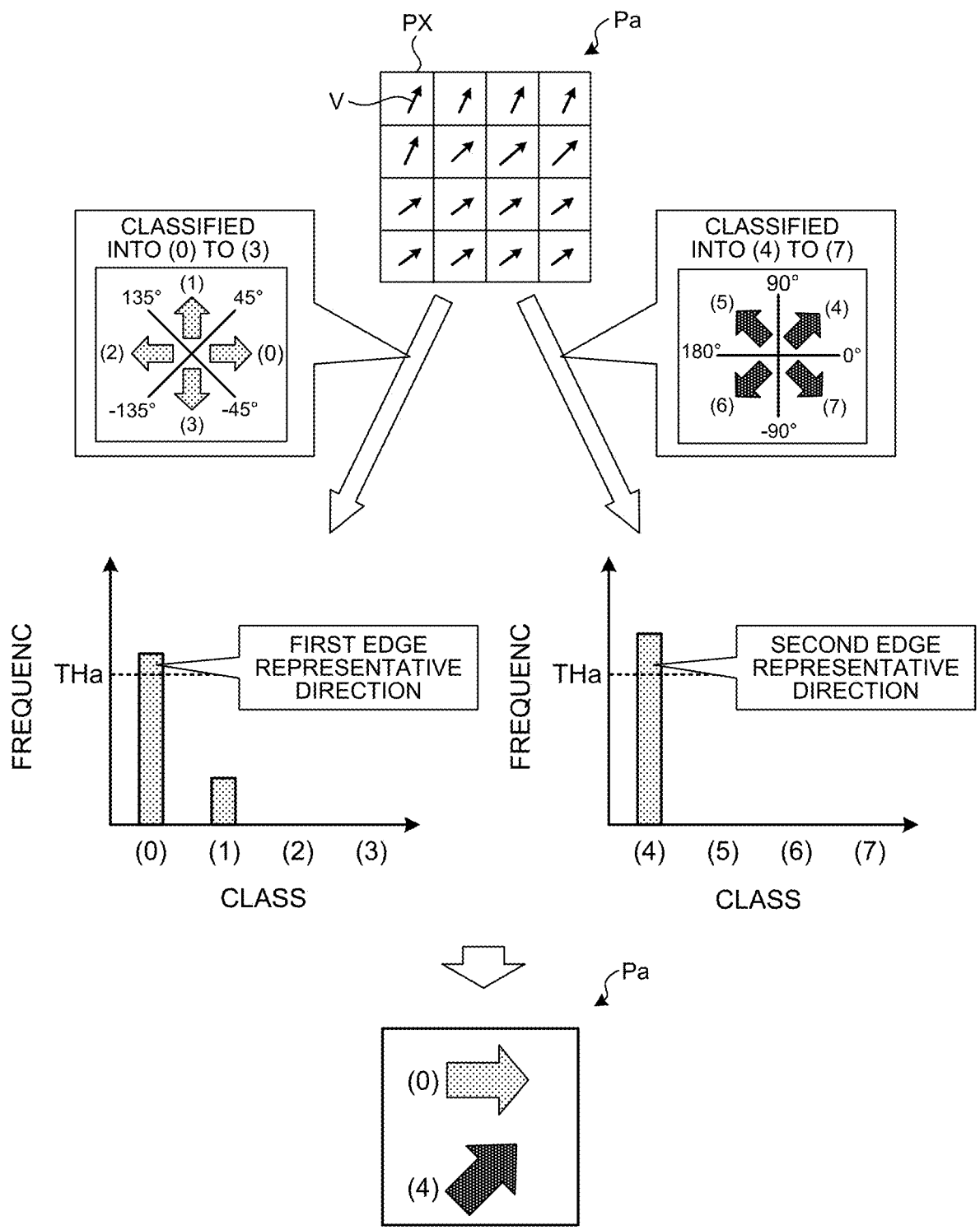
FIG. 6 is a diagram illustrating a process content of an algorithm execution unit.

FIG. 6 to FIG. 9 are diagrams illustrating a process content of the algorithm execution unit 23. As illustrated in FIG. 6, the algorithm execution unit 23 determines an edge representative direction in a pixel region based on a vector V (see FIG. 3) of each pixel PX that is calculated by the calculation unit 22. Specifically, as illustrated in FIG. 6, the algorithm execution unit 23 determines, for each pixel region, a first edge representative direction that is provided with a first angular range as a unit and a second edge representative direction that is provided with a second angular range that is different from the first angular range as a unit, based on a vector V of each pixel PX in a pixel region.

Specifically, the algorithm execution unit 23 classifies each pixel PX into each of one of signs "(0)" to "(3)" that are provided by dividing −180° to 180° by a first angular range of 90° and one of sigs "(4)" to "(7)" that are provided by dividing it by a second angular range with a dividing angular boundary that is different from that of the first angular range, based on a vector V of each pixel PX.

More specifically, an edge angle in a vector V is classified into sign "(0)" in a case where it is within an angular range that is greater than or equal to −45° and less than 45°, classified into sign "(1)" in a case where it is within an angular range that is greater than or equal to 45° and less than 135°, classified into sign "(2)" in a case where it is within an angular range that is greater than or equal to 135° and less than 180° or greater than or equal to −180° and less than −135°, or classified into sign "(3)" in a case where it is within an angular range that is greater than or equal to −135° and less than −45°.

Moreover, an edge angle in a vector V is classified into sign "(4)" in a case where it is within an angular range that is greater than or equal to 0° and less than 90°, classified into sign "(5)" in a case where it is within an angular range that is greater than or equal to 90° and less than 180°, classified into sign "(6)" in a case where it is within an angular range that is greater than or equal to −180° and less than −90°, or classified into sign "(7)" in a case where it is within an angular range that is greater than or equal to −90° and less than 0°.

Then, as illustrated on a lower column of FIG. 6, the algorithm execution unit 23 generates, for each pixel region, a histogram where signs "(0)" to "(3)" are respective classes and a histogram where signs "(4)" to "(7)" are respective classes. Then, in a case where a frequency for a class with a highest frequency in generated histograms is greater than or equal to a predetermined threshold THa, the algorithm execution unit 23 determines that sign "(0)" that corresponds to such a class is a first edge representative direction and sign "(4)" is a second edge representative direction. That is, a determination process for an edge representative direction that is executed by the algorithm execution unit 23 is also considered to be a process for coding each divided region Sa.

A frequency of a histogram as described above is calculated by summing edge intensities of pixels PX that are classified into an identical angular range, among respective pixels PX in a pixel region. Specifically, a frequency of a histogram at a class with sign "(0)" will be considered. For example, it is assumed that three pixels PX that are classified into sign "(0)" are provided and edge intensities in respective pixels PX are 10, 20, and 30. In such a case, a frequency of a histogram at a class with sign "(0)" is calculated as 10+20+30=60.

The algorithm execution unit 23 determines an edge intensity of a pixel region based on thus calculated histogram. Specifically, for an edge representative intensity, in a case where a frequency of a class with a highest frequency in a histogram is greater than or equal to a predetermined threshold THa, a frequency that corresponds to such a class is provided as an edge intensity. That is, it is also considered that a determination process for an edge intensity in the algorithm execution unit 23 is a process for extracting a feature that relates to an edge intensity that is provided by taking into consideration a number of pixels PX that are oriented in an identical direction in a pixel region that corresponds to an edge representative direction.

On the other hand, in a case where a frequency of a class with a highest frequency is less than a predetermined threshold THa, the algorithm execution unit 23 deals with an edge representative direction of such a pixel region as "invalidation", in other words, "no edge representative direction". Thereby, in a case where a dispersion of edge angles of respective pixels PX is large, it is possible to prevent erroneously determining a particular edge representative direction.

Thus, the algorithm execution unit 23 associates edge representative directions that are respectively different between a first angular range and a second angular range with pixel regions. Thereby, it is possible to increase the number of data that are used for detection of an attached substance region, so that it is possible to improve detection accuracy for such an attached substance region.

Additionally, a determination process for an edge representative direction as illustrated in FIG. 6 is an example, and any process content is provided as long as a process capable of determining an edge representative direction is provided. For example, an average value of edge angles of respective pixels in a pixel region may be calculated to determine an edge representative direction in an angular range that corresponds to such an average value.

Furthermore, the calculation unit 22 may use an edge intensity of a pixel region that is obtained by a technique for the algorithm execution unit 23. For an edge intensity of a pixel region that is obtained by the algorithm execution unit 23, such an edge intensity is calculated by taking into consideration the number of pixels PX that are oriented in an identical classification direction in a pixel region. Hence, it has a characteristic that reflects global edge behavior rather than simply obtaining a representation of an edge intensity of a pixel PX. For an attached substance such as snow, it is effective to take into consideration such global edge behavior, in other words, a degree of aggregation of a change of an edge, so that it is possible to estimate a snow-buried state more reliably by using an edge intensity of a pixel region that is obtained by a technique for the algorithm execution unit 23.

Furthermore, although FIG. 6 illustrates a case where 4×4 pixels PX or 16 pixels PX in total are provided as one pixel region, the number of pixels PX in a pixel region may be set arbitrarily, and further, the numbers of pixels PX in an upward or downward direction and a leftward or rightward direction may be different so as to be 3×5 or the like.

Subsequently, the algorithm execution unit 23 extracts an array pattern 150 where an identical edge representative direction is successive in a predetermined scanning direction. Specifically, the algorithm execution unit 23 scans, in a leftward or rightward direction and an upward or downward direction, a plurality of pixel regions that are two-dimensionally arrayed in a leftward or rightward direction and an upward or downward direction of a captured image I to extract an array pattern 150. Additionally, a leftward or rightward direction and an upward or downward direction are an example of a first scanning direction and a second scanning direction. Furthermore, a scanning direction is not limited to a leftward or rightward direction and an upward or downward direction and may be an oblique direction.

Herein, in a case where edge representative directions that are adjacent in a scanning direction are directions that are adjacent to an edge representative direction of an array pattern 150, the algorithm execution unit 23 extracts the array pattern 150.

Figure 7:
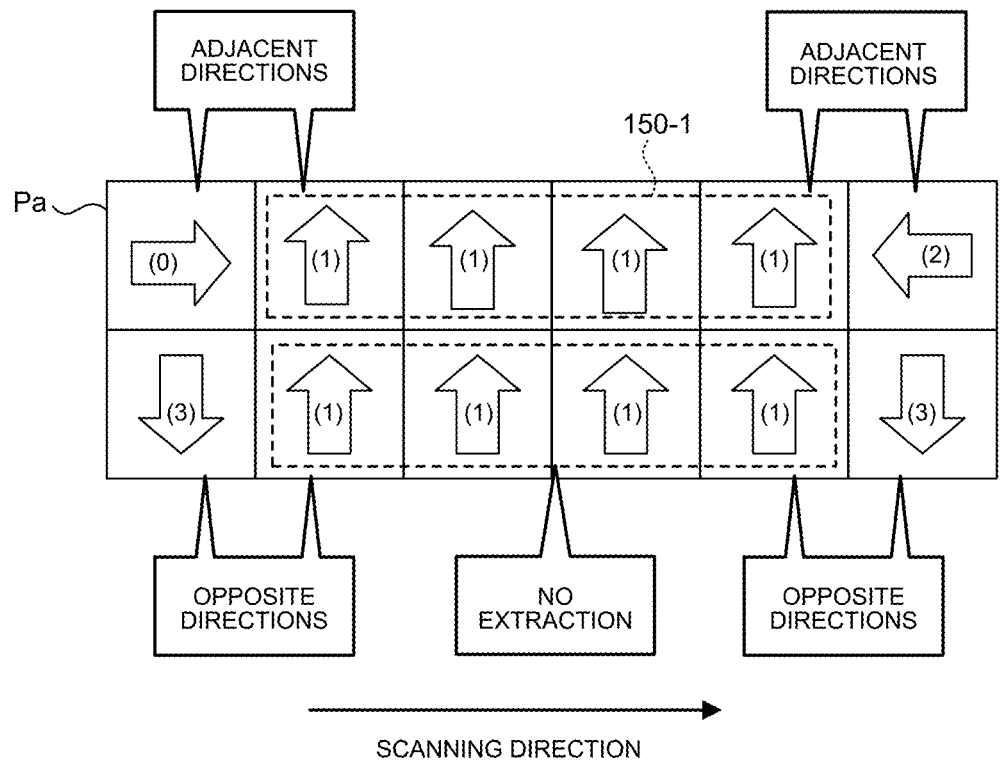
FIG. 7 is a diagram illustrating a process content of an algorithm execution unit.

Specifically, as illustrated in FIG. 7, in a case where four pixel regions where an edge representative direction is "(1)" are successive, the algorithm execution unit 23 refers to edge representative directions of divided regions Sa that are located at either side of such four pixel regions, so that an array pattern 150-1 is extracted.

Specifically, as illustrated on an upper column of FIG. 7, in a case where edge representative directions on either side of an array pattern that is composed of four "(1)" are directions that are adjacent to edge representative directions "(1)" of an array pattern, the algorithm execution unit 23 extracts such an array pattern as an array pattern 150-1.

On the other hand, as illustrated on a lower column of FIG. 7, in a case where edge representative directions on either side of an array pattern that is composed of four "(1)" are edge representative directions "(3)" that are directions opposite to edge representative directions "(1)" of the array pattern, the algorithm execution unit 23 does not extract such an array pattern as an array pattern 150-1.

This is because an edge angle tend to be changed gently and an edge angel is changed successively in a snow-buried region as described above and hence adjacent divided regions Sa do not tend to take edge representative directions that are mutually opposite directions.

That is, the algorithm execution unit 23 extracts only an array pattern 150 that has edge representative directions that are successively changed in a scanning direction and excludes an array pattern that is irregularly changed in the scanning direction from an extraction target. Thereby, it is possible to improve extraction accuracy of an array pattern 150 that corresponds to a snow-buried region.

Furthermore, as described above, edge representative directions are successively changed in a snow-buried region, so that it has a feature in such a manner that a length of one array pattern falls within a predetermined range. Hence, it is also possible for the algorithm execution unit 23 to extract only an array pattern 150 with a length that falls within a predetermined range.

Although a predetermined range as mentioned herein is, for example, 24 pixels PX (3 pixel regions) to 100 pixels PX (25 pixel regions), this is not limiting and it is possible to change it arbitrarily.

Thereby, it is possible to extract only an array pattern 150 that corresponds to a snow-buried region. In other words, an array pattern that does not coincide with a feature of a snow-buried region is not extracted, so that it is possible to improve detection accuracy for a snow-buried region as an attached substance region.

Additionally, although an extraction process for an array pattern 150-1 that corresponds to a first angular range where a scanning direction is a leftward or rightward direction has been provided as an example and explained in FIG. 7, an extraction process for an array pattern 150 with edge representative directions that correspond to a second angular grange where a scanning direction is an upward or downward direction is similar thereto.

Figure 8:
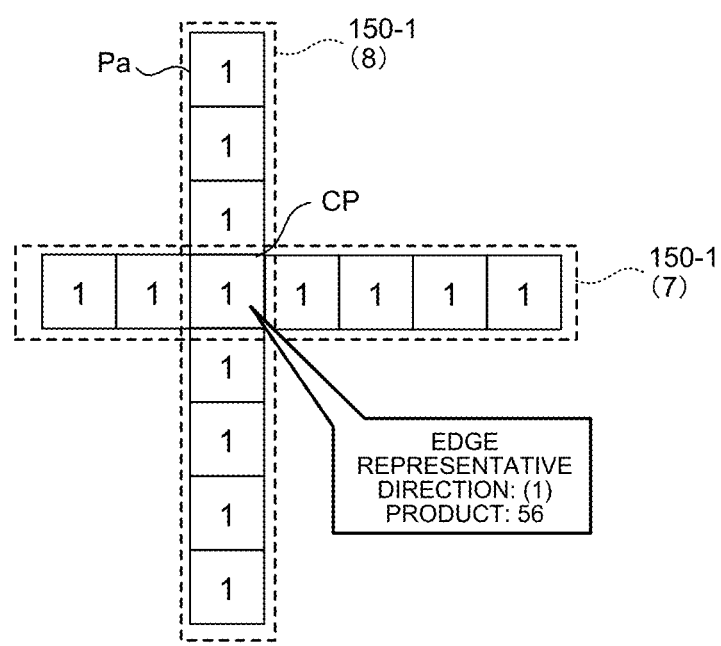
FIG. 8 is a diagram illustrating a process content of an algorithm execution unit.

Subsequently, the algorithm execution unit 23 calculates a score of each pixel region based on an array pattern 150 that is extracted by the algorithm execution unit 23. Specifically, as illustrated in FIG. 8, the algorithm execution unit 23 calculates a point of intersection CP between an array pattern 150-1 where eight "1" are successive in an upward or downward direction and an array pattern 150-1 where seven "1" are successive in a leftward or rightward direction.

Subsequently, the algorithm execution unit 23 calculates a product of the numbers of pixel regions of both array patterns 150-1 that form a point of intersection CP. An example as illustrated in FIG. 8 illustrates a case where a product is "8×7=56". That is, it is possible to approximately calculate a size of a set of identical edge representative directions that correspond to a point of intersection CP by a product of respective points of intersection CP.

As a product of respective points of intersection CP is increased, it means that identical edge representative directions are distributed successively over a wide range. That is, a product of points of intersection CP is obtained, so that it is possible to readily calculate an aggregate of edge representative directions.

Then, the algorithm execution unit 23 associates edge representative directions and intersection point information that indicates a product as described above with a point of intersection CP.

Additionally, the algorithm execution unit 23 may count the number of pixel regions that form one aggregate of edge representative directions, instead of a product of points of intersection CP. In such a case, for example, it is possible to calculate a sum of the number of an array pattern 150-1 that is extracted in a leftward or rightward direction and the number of an array pattern 150-1 that is adjacent to such an array pattern 150-1 in an upward or downward direction as a size of one aggregate of edge representative directions.

Subsequently, as illustrated in FIG. 9, the algorithm execution unit 23 sets an attention region SaT and determines whether or not the attention region SaT is an attached substance region based on a point of intersection CP in an extension region Ea that is provided by extending the attention region SaT.

Herein, an attention region SaT is one divided region Sa and an extension region Ea is 3×3 divided regions Sa that are centered at the attention region SaT. Additionally, an extension region Ea may be another region as long as such a region is centered at an attention region SaT and is greater than the attention region SaT.

The algorithm execution unit 23 determines whether or not an attention region SaT is an attached substance region based on intersection point information that is included in an extension region Ea. Specifically, as illustrated in FIG. 9, sums of products that are based on each of a first angular range and a second angular range are calculated for each edge representative direction.

An example as illustrated in FIG. 9 illustrates a case where sums of products of edge representative directions "(0)" to "(3)" that are based on a first angular range are "80", "67", "75", and "58", respectively, and a total value that is provided by adding them is "280".

Furthermore, an example as illustrated in FIG. 9 illustrates a case where sums of products of edge representative directions "(4)" to "(7)" that are based on a second angular range are "73", "42", "18", and "32", respectively, and a total value that is provided by adding them is "165".

In a case where a predetermined condition is satisfied in an extension region Ea, the algorithm execution unit 23 calculates a score of an attention region SaT as "1". On the other hand, in a case where a predetermined condition is not satisfied in an extension region Ea, the algorithm execution unit 23 calculates a score of an attention region SaT as "0".

Herein, a predetermined condition indicates that points of intersection CP of all kinds of edge representative directions are provided in an extension region Ea and each of a total value of products in a first angular range and a total value of products in a second angular range is greater than a predetermined threshold.

That is, the algorithm execution unit 23 calculates a score as "1" in a case where a product of representative edge directions of each of a first angular range and a second angular range is greater than or equal to "1" and a total value in each of the first angular range and the second angular range is greater than a predetermined threshold.

That is, in a case where an extension region Ea has a point of intersection CP that is based on all edge representative directions and is a set of divided regions Sa where respective edge representative directions have certain magnitudes, a score for an attention region SaT is calculated as "1".

Then, the algorithm execution unit 23 generates a score image 200-1 that indicates a score for each attention region SaT, that is, each divided region Sa and transmits it to the determination unit 24. Additionally, a divided region Sa with a score that is "1" is a region with a high possibility of being a snow-buried region and a divided region Sa with a score that is "0" is a region with a low possibility of being a snow-buried region.

By returning to an explanation of FIG. 2, the determination unit 24 will be explained. The determination unit 24 determines whether or not a target region 100 is an attached substance region where an attached substance is attached to a lens of an image-capturing device, based on a score that is calculated by the calculation unit 22.

In the present embodiment, the determination unit 24 determines a final score of each divided region Sa based on a score image 200 that is generated by the calculation unit 22 and a score image 200-1 that is generated by the algorithm execution unit 23. Afterward, the determination unit 24 determines whether or not a target region 100 is an attached substance region based on a determined final score.

Figure 10:
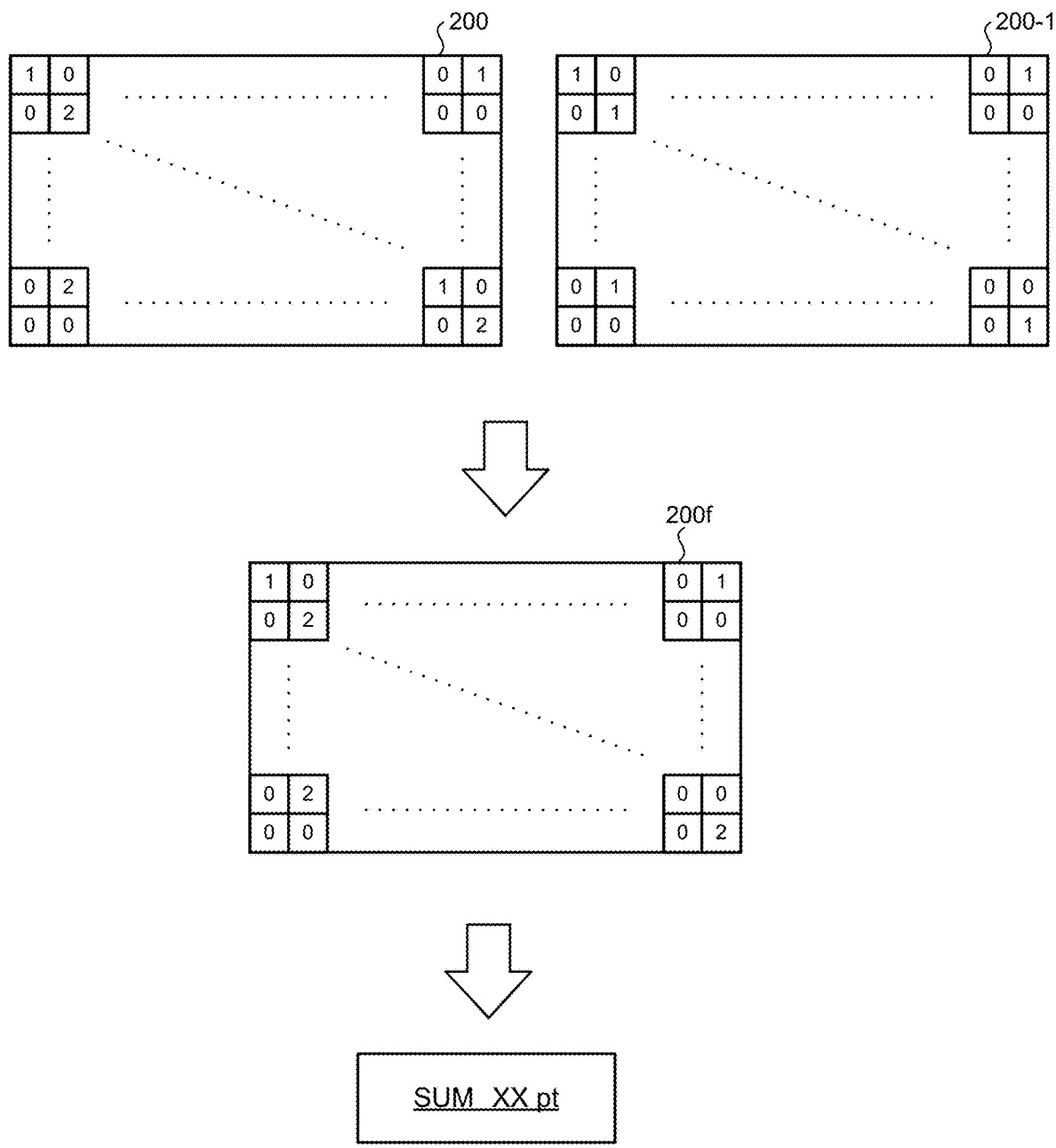
FIG. 10 is a diagram illustrating a process content that is executed by a determination unit.

FIG. 10 is a diagram illustrating a process content of the determination unit 24. As illustrated in FIG. 10, the determination unit 24 multiplies scores of respective divided regions Sa that correspond to score images 200, 200-1, respectively, so as to determine a final score of the respective divided regions Sa, and generates a score image 200f that indicates a determined final score.

As described above, in each of score images 200, 200-1, a divided region Sa with a high score is a region with a high possibility of being a snow-buried region and a divided region Sa with a score that is "0" is a region with a low possibility of being a snow-buried region.

That is, scores of both score images 200, 200-1 in each divided region Sa are multiplied, so that a final score of only a divided region Sa that is determined to have a high possibility of being a snow-buried region in both score images 200, 200-1 is greater than or equal to "1". In other words, a final score of a divided region Sa that is determined to have a low possibility of being a snow-buried region in at least one of score images 200, 200-1 is "0".

Thus, the determination unit 24 calculates a final score of each divided region Sa based on a score that is calculated by each of a plurality of algorithms, so that it is possible to improve accuracy of such a score.

Subsequently, the determination unit 24 calculates a sum of scores in a score image 200f, and determines a target region 100 as an attached substance region in a case where a calculated sum is greater than a sum threshold. Herein, a sum threshold is, for example, "a maximum value of a sum of scores in a target region 100"×40%.

That is, the determination unit 24 provides a threshold not for a proportion of a divided region Sa with a high possibility of being a snow-buried region in a target region 100 but for a sum of scores. Thereby, it is possible to determine a target region 100 that has a divided region Sa with a partially high score or a target region 100 with a generally low score and a high sum of scores, as an attached substance region, by a single determination process.

Next, process steps that are executed by the attached substance detection device 1 according to an embodiment will be explained by using FIG. 11. FIG. 11 is a flowchart illustrating process steps that are executed by the attached substance detection device 1. Additionally, process steps as illustrated below are repeatedly executed by the control unit 2 for each acquisition of a captured image I.

As illustrated in FIG. 11, first, as the attached substance detection device 1 acquires a captured image I (step S101), it calculates a point of each pixel region that is dependent on an edge intensity (step S102). Subsequently, the attached substance detection device 1 calculates a score for each divided region Sa based on a calculated point (step S103).

Subsequently, the attached substance detection device 1 calculates a score by an algorithm that is based on an edge angle (step S104), and determines a final score of each divided region Sa based on both scores that are calculated at step S103 and step S104 (step S105).

Subsequently, the attached substance detection device 1 determines whether or not a sum of scores in a target region 100 is greater than a sum threshold (step S106), determines the target region 100 as an attached substance region (step S107) in a case where the sum of scores is greater than the sum threshold (step S106, Yes), and ends such a process.

Furthermore, the attached substance detection device 1 ends such a process in a case where a sum of scores is less than or equal to a sum threshold in a determination process at step S106 (step S106, No).

As described above, the attached substance detection device 1 according to an embodiment includes the calculation unit 22 and the determination unit 24. The calculation unit 22 calculates a score of a divided region Sa that is provided by dividing a predetermined target region 100, based on an edge intensity in each pixel region of a captured image I that is captured by an image-capturing device.

The determination unit 24 determines whether or not a target region 100 is an attached substance region where an attached substance is attached to a lens of an image-capturing device, based on a score that is calculated by the calculation unit 22. Therefore, it is possible for the attached substance detection device 1 according to an embodiment to detect an attached substance early.

Meanwhile, although a case where a target region 100 is composed of a plurality of divided regions Sa has been explained in an embodiment as described above, this is not limiting. That is, a target region 100 may be a single divided region Sa. That is, this corresponds to a time when a case where a whole surface is buried by snow is desired to be detected, or the like.

In such a case, in particular, the calculation unit 22 calculates a score for a pixel region with an edge intensity that falls within a predetermined range as "1" and calculates a score for a pixel region with an edge intensity that deviates from the predetermined range as "0".

Herein, a predetermined range is a range of an edge intensity from "1" to a predetermined threshold. That is, in a case where an edge intensity is "0" or a high edge, a score is "0", or in a case where an edge intensity is a low edge other than "0" (or includes a middle edge), a score is calculated as "1". Additionally, it is also considered that thus setting scores of 0 and 1 is, in other words, to count the number of pixel regions with an edge intensity that is a low edge other than "0".

Then, in a case where a sum of scores in a target region 100 is greater than a threshold (for example, 40%), the determination unit 24 determines such a target region 100 as an attached substance region. Even in such a case, it is possible to determine an attached substance region from a single captured image I, so that it is possible to detect an attached substance early.

Furthermore, although a captured image I that is captured by a camera that is mounted on a vehicle is used in an embodiment as described above, such a captured image I may be, for example, a captured image I that is captured by a security camera or a camera that is installed on a street light or the like. That is, it is sufficient that a captured image I is captured by a camera where it is possible for an attached substance to attach to a lens of such a camera.

According to the present invention, it is possible to detect an attached substance early.

An additional effect or variation can readily be derived by a person(s) skilled in the art. Accordingly, a broader aspect of the present invention is not limited to a specific detail(s) and a representative embodiment(s) as illustrated and described above. Therefore, various modifications are allowed without departing from the spirit or scope of a general inventive concept that is defined by the appended claim(s) and an equivalent(s) thereof.

What is claimed is:

1. An attached substance detection device comprising: a processor programmed to:
   calculate a score of each of a plurality of divided regions that are obtained by dividing a target region of an image that is captured by an image-capturing device into the plurality of divided regions, each of the divided regions having at least one pixel region, the score being calculated based on an edge intensity of the pixel regions in the divided regions; and
   determine whether or not the target region is an attached substance region where a substance is attached to a lens of the image-capturing device, based on the score that has been calculated,
   wherein the edge intensity of each of the pixel regions is determined from intensities in two perpendicular directions of edges of a pixel in the pixel region.

2. The attached substance detection device according to claim 1, wherein the processor is further programmed to:
   calculate a point value that is dependent on the edge intensity for each of the pixel regions;
   calculate the score for each of the divided regions based on a sum of the point values of the pixel regions in each of the divided regions; and
   determine the target region to be the attached substance region in a case where a sum of the scores of the divided regions that are included in the target region satisfies a threshold condition.

3. The attached substance detection device according to claim 1, wherein the processor is further programmed to:
   calculate the score for each of the divided regions based on whether or not the edge intensity of the pixel regions is within a predetermined range; and
   determine the target region to be the attached substance region in a case where a sum of the scores of the divided regions that are included in the target region satisfies a threshold condition.

4. The attached substance detection device according to claim 1, wherein
   the processor is further programmed to determine whether or not the target region is the attached substance region based on the score that has been calculated and another score that is calculated by a different algorithm.

5. The attached substance detection device according to claim 1, wherein each of the divided regions includes a plurality of the pixel regions, and the processor is further programmed to:
   calculate a point value that is dependent on the edge intensity for each of the pixel regions within each of the divided regions;
   calculate the score for each of the divided regions based on a sum of the point values of the pixel regions in each of the divided regions; and
   determine the target region to be the attached substance region in a case where a sum of the scores of the divided regions that are included in the target region satisfies a threshold condition.

6. An attached substance detection method comprising:
   calculating a score of each of a plurality of divided regions that are obtained by dividing a target region of an image that is captured by an image-capturing device into the plurality of divided regions, each of the divided regions having at least one pixel region, the score being calculated based on an edge intensity of the pixel regions in the divided regions; and
   determining whether or not the target region is an attached substance region where a substance is attached to a lens of the image-capturing device, based on the score that has been calculated,
   wherein the edge intensity of each of the pixel regions is determined from intensities in two perpendicular directions of edges of a pixel in the pixel region.

7. The attached substance detection method according to claim 6, wherein each of the divided regions includes a plurality of the pixel regions, and the method further comprises:
   calculating a point value that is dependent on the edge intensity for each of the pixel regions within each of the divided regions;
   calculating the score for each of the divided regions based on a sum of the point values of the pixel regions in each of the divided regions; and
   determining the target region to be the attached substance region in a case where a sum of the scores of the divided regions that are included in the target region satisfies a threshold condition.

* * * * *